(12) United States Patent
Hong et al.

(10) Patent No.: US 9,966,626 B2
(45) Date of Patent: May 8, 2018

(54) REDOX FLOW BATTERY

(71) Applicant: OCI COMPANY LTD., Seoul (KR)

(72) Inventors: Ji-Eun Hong, Seongnam-si (KR);
Seung-Yoen Lee, Seongnam-si (KR);
Soo-Whan Kim, Seongnam-si (KR);
Hee-Chang Ye, Seongnam-si (KR);
Byung-Chul Kim, Seongnam-si (KR)

(73) Assignee: OCI COMPANY LTD., Seoul (KR)

( * ) Notice: Subject to any disclaimer, the term of this patent is extended or adjusted under 35 U.S.C. 154(b) by 0 days. days.

(21) Appl. No.: 15/119,908

(22) PCT Filed: Feb. 16, 2015

(86) PCT No.: PCT/KR2015/001580
§ 371 (c)(1),
(2) Date: Aug. 18, 2016

(87) PCT Pub. No.: WO2015/126131
PCT Pub. Date: Aug. 27, 2015

(65) Prior Publication Data
US 2017/0054172 A1    Feb. 23, 2017

(30) Foreign Application Priority Data

Feb. 20, 2014 (KR) .................. 10-2014-0019881

(51) Int. Cl.
*H01M 8/18* (2006.01)
*H01M 8/20* (2006.01)
*H01M 8/02* (2016.01)

(52) U.S. Cl.
CPC ............ *H01M 8/188* (2013.01); *H01M 8/02* (2013.01); *H01M 8/20* (2013.01); *Y02E 60/528* (2013.01)

(58) Field of Classification Search
CPC ................................ H01M 8/188; H01M 8/02
See application file for complete search history.

(56) References Cited

U.S. PATENT DOCUMENTS

| | | | |
|---|---|---|---|
| 4,786,567 A | * | 11/1988 | Skyllas-Kazacos .... H01M 4/86 429/105 |
| 8,541,138 B2 | | 9/2013 | Kazacos et al. |
| 2006/0183016 A1 | | 8/2006 | Kazacos et al. |

FOREIGN PATENT DOCUMENTS

| CN | 103367785 A | 10/2013 |
|---|---|---|
| EP | 3024080 A1 | 5/2016 |

(Continued)

OTHER PUBLICATIONS

Extended European Search Report dated Jul. 10, 2017 from European Patent Office in connection with the counterpart European Patent Application No. 15752422.4, citing the above reference(s).

(Continued)

*Primary Examiner* — Olatunji Godo
(74) *Attorney, Agent, or Firm* — Hauptman Ham, LLP

(57) ABSTRACT

The present invention relates to a redox flow battery, and more particularly, to a redox flow battery which is charged and discharged by supplying a positive electrolyte and a negative electrolyte to a battery cell using an active material containing vanadium and a cation exchange membrane, in which the positive electrolyte and the negative electrolyte contain vanadium ions as active ions, the difference in volume between the positive electrolyte and the negative electrolyte is maintained at 10% or less, and the total concentration of anions in the negative electrolyte is higher than the total concentration of anions in the positive electrolyte, whereby the transfer of water in the battery is controlled and a change in the volume of the electrolytes is minimized.

8 Claims, 1 Drawing Sheet

(56) References Cited

FOREIGN PATENT DOCUMENTS

| JP | 2003-157882 A | 5/2003 |
| JP | 2004-071165 A | 3/2004 |
| JP | 2001-167787 A | 6/2011 |
| KR | 10-2012-0132620 A | 12/2012 |

OTHER PUBLICATIONS

Chenxi Sun et al., "Investigations on transfer of water and vanadium ions across Nafion membrane in an operating vanadium redox flow battery", Journal of power sources 195 (2010), pp. 890-897.
International Search Report for PCT/KR2015/001580 dated Apr. 27, 2015, citing the above reference(s).

* cited by examiner

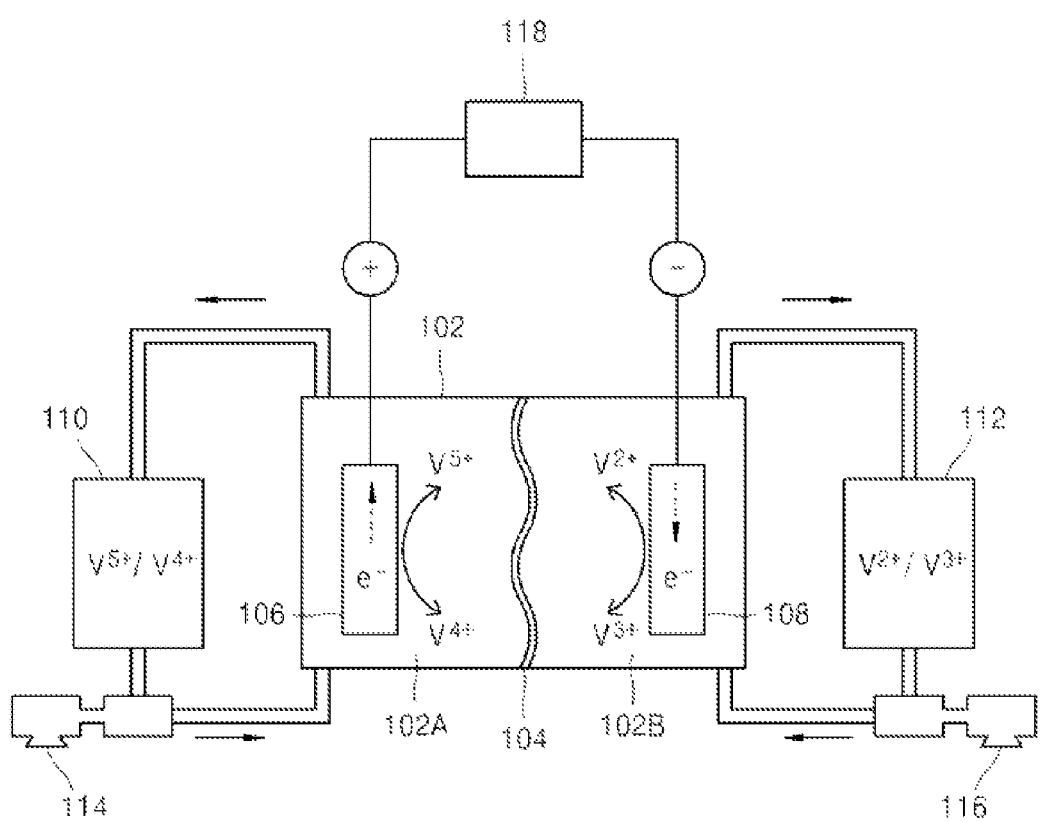

REDOX FLOW BATTERY

CROSS REFERENCE TO RELATED APPLICATION

This application claims the priority of Korean Patent Application No. 10-2014-0019881, filed on Feb. 20, 2014 in the Korean Patent and Trademark Office. This application, in its entirety, is incorporated herein by reference. Further, this application is the National Phase application of International Application No. PCT/KR2015/001580 filed Feb. 16, 2015, which designates the United States and was published in Korean.

TECHNICAL FIELD

The present invention relates to a redox flow battery, and more particularly, to a redox flow battery which is charged and discharged by supplying a positive electrolyte and a negative electrolyte to a battery cell using an active material containing vanadium and a cation exchange membrane, in which the positive electrolyte and the negative electrolyte contain vanadium ions as active ions, the difference in volume between the positive electrolyte and the negative electrolyte is maintained at 10% or less, and the total concentration of anions in the negative electrolyte is higher than the total concentration of anions in the positive electrolyte, whereby the transfer of water in the battery is controlled and a change in the volume of the electrolytes is minimized.

BACKGROUND ART

In conventional redox flow battery systems, a cation exchange membrane is generally used. When a cation exchange membrane is used during the operation of a redox flow battery, a phenomenon is observed in which vanadium is transferred from the negative electrolyte to the positive electrolyte during redox reactions. To reduce the change in vanadium concentration caused by this transfer, a large amount of water is also transferred from the negative electrolyte to the positive electrolyte.

It was reported that, when a battery was constructed using Nafion 115, which is a general cation-exchange membrane, and positive and negative electrolytes having the same initial volume, about 7-10% of the electrolyte was transferred to the positive electrode of the battery (Investigations on transfer of water and vanadium ions across Nafion membrane in an operating vanadium redox flow battery.

The difference in volume between the negative electrolyte and the positive electrolyte increases as discharge is repeated, and this phenomenon causes a problem in that a free space should be ensured in electrolyte storage tanks. This problem is more serious when the size of the battery is increased for commercial use. Ensuring the free space based on the expectation of a change in the volume of the electrolytes is disadvantageous in economic terms, and can also adversely affect the durability of the storage tank by changing the internal pressure of the storage tank.

In addition, if a large amount of water is transferred to the positive electrode, the concentration of anions will decrease in the positive electrolyte and increase in the negative electrolyte to thereby reduce the stability of the electrolytes, because anions are not freely transferred due to the cation exchange membrane. For example, it is already well known that, if sulfate ions are used as a supporting electrolyte, $V^{2+}$ and $V^{3+}$ ions in the negative electrolyte are unstable at high sulfate ion concentrations to cause problems such as the precipitation of vanadium.

In the prior art, an attempt was made to solve the problem in that the state of the electrolytes changes after charge and discharge, by restoring transferred ions or controlling the diffusion coefficient of ions.

As a method for restoring transferred vanadium ions, studies focused on restoring vanadium ions to the initial state by remixing a positive electrolyte and a negative electrolyte after use have been conducted. Representative examples of this method include a total mixing method in which the two electrolytes are mixed and divided into two portions, and a partial transfer method in which a portion of a positive electrolyte, determined on the calculated amount of transferred vanadium ions, is transferred to a negative electrolyte.

However, the total mixing method and the partial transfer method all have disadvantages in that it is difficult to accurately calculate the amount of vanadium ions and in that the risk of heat generation cannot be avoided when the two electrolytes are mixed with each other in a state in which they are not completely discharged. An operation of completely discharging two electrolytes during the use of the battery in real life is troublesome and inconvenient, and the time required to mix the two electrolytes with each other increases as the size of the battery increases. For this reason, it is actually impossible to frequently perform the total mixing method. In addition, even when the electrolytes are mixed by the partial transfer method, they are not restored to a state completely identical to the initial state, and this problem is also to be solved. Although vanadium ions transferred to the positive electrode can be restored, anions are highly likely to accumulate in the negative electrolyte, because anions are also transferred during the transfer of vanadium ions.

Other prior technologies include a method of reducing the transfer of specific ions using an improved exchange membrane. However, because a mechanism by which ions passes through the exchange membrane is not perfectly known, it is difficult to study this technology, and this technology is expected to be put to practical use and commercialized after a considerable amount of time.

DISCLOSURE

Technical Problem

The present invention has been made in order to solve the above-described problems, and it is an object of the present invention to provide a redox flow battery in which the transfer of water is controlled and a change in the volume of electrolytes is minimized.

Technical Solution

According to an exemplary embodiment of the present invention, there is provided a redox flow battery which is charged and discharged by supplying a positive electrolyte and a negative electrolyte to a battery cell using an active material containing vanadium and a cation exchange membrane, in which the positive electrolyte and the negative electrolyte include vanadium ions as active ions, the difference in volume between the positive electrolyte and the negative electrolyte is maintained at 10% or less, and the total concentration of anions in the negative electrolyte is higher than the total concentration of anions in the positive electrolyte.

Advantageous Effects

The redox flow battery according to the present invention has excellent stability, because the difference in volume between a positive electrolyte and a negative electrolyte is minimized even when the battery is repeatedly charged and discharged.

In addition, the redox flow battery has excellent durability, because an essential free space in the positive electrolyte and negative electrolyte tanks of the redox flow battery can be reduced, and the change in internal pressure of the tanks by a change in the volume of the electrolytes also decreases.

BRIEF DESCRIPTION OF DRAWINGS

FIG. 1 shows the configuration of a redox flow battery which is controlled according to the present invention.

MODE FOR INVENTION

The advantages and features of the present invention, and methods for achieving them, will be clearly understood from the embodiments described below with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. The scope of the present invention should be defined only by the appended claims.

Hereinafter, a redox flow battery according to exemplary embodiments of the present invention will be described.

A redox flow battery according to an exemplary embodiment of the present invention is charged and discharged by supplying a positive electrolyte and a negative electrolyte to a battery cell using an active material containing vanadium and a cation exchange membrane, in which the positive electrolyte and the negative electrolyte include vanadium ions as active ions, the difference in volume between the positive electrolyte and the negative electrolyte is maintained at 10% or less, and the total concentration of anions in the negative electrolyte is higher than the total concentration of anions in the positive electrolyte.

The redox flow battery includes vanadium as an active material, and produces electrical energy by redox reactions in the positive and negative electrolytes.

In the negative electrolyte, a redox reaction as shown in the following reaction equation 1 occurs during charge and discharge, and in the positive electrolyte, a redox reaction as shown in the following reaction equation 2 occurs during charge and discharge:

$V^{3+} + e^- \leftrightarrow V^{2+}$, E0=−0.255V   Reaction equation 1

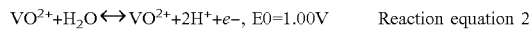
$VO^{2+} + H_2O \leftrightarrow VO^{2+} + 2H^+ + e^-$, E0=1.00V   Reaction equation 2

The redox flow battery is configured such that the negative electrolyte and the positive electrolyte are stored in different storage tanks and connected to electrode cells, which are separated from each other by an ion exchange membrane, so as to be circulated through the cells.

The storage tanks that store the negative electrolyte and the positive electrolyte are connected to a negative electrode cell and a positive electrode cell, respectively, so that the electrolytes can be circulated through the cells.

The redox flow battery may include a peristaltic pump so that the negative or positive electrolyte can be circulated by the pump.

The redox flow battery according to the present invention will now be described in further detail with reference to FIG. 1.

FIG. 1 shows the configuration of a redox flow battery which is controlled according to the present invention.

Referring to FIG. 1, a positive electrolyte (catholyte) is stored in a positive electrolyte storage tank 110, and a negative electrolyte (anolyte) is stored in a negative electrolyte storage tank 112.

The negative electrolyte may include divalent vanadium ions ($V^{2+}$) or trivalent vanadium ions ($V^{3+}$) as negative electrolyte ions, and the positive electrolyte may include tetravalent vanadium ions ($V^{4+}$) or pentavalent vanadium ions ($V^{5+}$) as positive electrolyte ions.

The positive electrolyte and negative electrolyte stored in a positive electrolyte storage tank 110 and a negative electrolyte storage tank 112 are introduced into the positive electrode cell 102A and negative electrode cell 102B of a cell 102, respectively, by pumps 114 and 116. In the positive electrode cell 102A, the transfer of electrons through an electrode 106 occurs as a result of the operation of a power source or load 118, and thus a redox reaction of $V^{5+} \leftrightarrow V^{4+}$ occurs. Similarly, in the negative electrode cell 102B, the transfer of electrons through an electrode 108 occurs as a result of the operation of the power source or load 118, and thus a redox reaction of $V^{2+} \leftrightarrow V^{3+}$ occurs. After the redox reactions, the positive electrolyte and the negative electrolyte are recycled to the positive electrolyte storage tank 110 and the negative electrolyte storage tank 112, respectively.

Meanwhile, the positive electrode cell 102A and the negative electrode cell 102B are separated from each other by a separator or membrane 104 through which ions can pass. Thus, the transfer of ions between the positive electrode cell 102A and the negative electrode cell 102B, that is, crossover, may occur. In other words, during the charge and discharge of the redox flow battery, positive electrolyte ions ($V^{5+}$ and $V^{4+}$) in the positive electrode cell 102A may be transferred to the negative electrode cell 102B, and negative electrolyte ions ($V^{2+}$ and $V^{3+}$) in the negative electrode cell 102B may be transferred to the positive electrode cell 102A.

The redox flow battery according to the present invention is characterized in that the difference in volume between the positive electrolyte and the negative electrolyte is maintained at 10% or less, and the total concentration of anions in the negative electrolyte is higher than the total concentration of anions in the positive electrolyte.

In the redox flow battery according to the present invention, the transfer of anions is restricted by the cation exchange membrane, the difference in anion concentration between the positive electrolyte and the negative electrolyte causes a difference in osmotic pressure between the two electrolytes, and thus water has a strong tendency to migrate from the positive electrolyte having relatively low anion concentration to the negative electrolyte having relatively high anion concentration.

This direction of transfer of water is opposite to the direction of transfer of water in a conventional battery system (in which the anion concentrations of positive and negative electrolytes are the same).

According to this principle, the force of vanadium that attracts water toward the positive electrode can reach equilibrium with the force of anions that attracts water toward the negative electrode, and thus the transfer of water can be reduced, thereby minimizing a change in the volume of the electrolytes in the redox flow battery.

Herein, the anions contained in each of the positive electrolyte and the negative electrolyte may include anion (A) dissociated from an active material, and anion (B) dissociated from a supporting electrolyte, in which anion (A) and anion (B) may be the same or different.

Specifically, anion (A) dissociated from the active material may be a sulfate ion, and anion (B) dissociated from the supporting electrolyte may be one or more selected from the group consisting of a sulfate ion, a nitrate ion and a phosphate ion.

In the present invention, the amount of the active material in the positive electrolyte should be the same as the amount of the active material in the negative electrolyte order to ensure the efficient operation of the battery. Thus, it is preferable that the amount of the supporting electrolyte in the negative electrolyte be larger than the amount of the supporting electrolyte in the positive electrolyte such that the total concentration of anions in the negative electrolyte is higher than the total concentration of anions in the positive electrolyte.

Because the concentration of vanadium ions in the positive electrolyte should be the same as the concentration of vanadium ions in the negative electrolyte, the amount of the active material in the positive electrolyte should be the same as the amount of the active material in the negative electrolyte, and the difference in volume between the positive electrolyte and the negative electrolyte should be maintained at 10% or less. If the volumes of positive and negative electrolytes having the same vanadium ion concentration in a battery system are not the same, the amount of the active material in the positive electrolyte will differ from the amount of the active material in the negative electrolyte. In this case, the capacity of the battery will be determined by the electrolyte having a smaller amount of the electrolyte, and a portion of the active material in the electrolyte having a larger amount of the active material, which corresponds to the difference in the amount of the active material, will not be used. In other words, the difference in volume between the positive and negative electrolytes should be maintained at the minimum level to efficiently operate the battery, and a difference of more than 10% in the volume causes an economic loss.

In the present invention, the total concentration of anions in the negative electrolyte should be higher than the total concentration of anions in the positive electrolyte, and anions contributing to the higher anion concentration are anions dissociated from the supporting electrolyte.

In the present invention, the ratio ($n_1$) of the total anion concentration ($C_1$) of the negative electrolyte to the total anion concentration ($C_2$) of the positive electrolyte, $C_1/C_2$, may satisfy the condition 1:

$1 < n_1 \leq 1.75.$        Condition 1

According to the present invention, the total concentration of anions in the negative electrolyte should be higher than the total concentration of anions in the positive electrolyte, and the $n_1$ value should be greater than 1. If the $n_1$ value is higher than 1.75, there will be a problem in that the difference in osmotic pressure between the positive and negative electrolytes excessively increases so that an opposite phenomenon occurs in which an increased amount of water is transferred from the positive electrolyte to the negative electrolyte, thus causing a gradual increase in the volume of the negative electrolyte during charge and discharge. For this reason, $n_1$ is preferably greater than 1 but not greater than 1.75. More preferably, $n_1$ may be $1 < n_1 \leq 1.6$, or $1.1 \leq n_1 \leq 1.5$.

Meanwhile, in the present invention, the ratio ($n_2$) of the total anion concentration ($C_1$) of the negative electrolyte to the vanadium ion concentration ($C_3$) of the negative electrolyte, $C_1/C_3$, may be $2 \leq n_2 \leq 3.5$.

If $n_2$ that is the ratio of the total anion concentration to the vanadium ion concentration of the negative electrolyte is greater than 3.5, there will be a problem in that the low-temperature stability of $V^{2+}$ and $V^{3+}$ ions is reduced.

Meanwhile, in the present invention, the ratio ($n_3$) of the total anion concentration ($C_2$) of the positive electrolyte to the vanadium ion concentration ($C_4$) of the positive electrolyte, $C_2/C_4$, may be $2 \leq n_3 \leq 3.5$.

If $n_3$ that is the ratio of the total anion concentration to the vanadium ion concentration of the positive electrolyte is greater than 3.5, there will be a problem in that the low-temperature stability of $V^{4+}$ ions is reduced.

Also, if $n_3$ that is the ratio of the total anion concentration to the vanadium ion concentration of the positive electrolyte is less than 2, there will be a problem in that the high-temperature stability of $V^{5+}$ ions is reduced.

Meanwhile, in the present invention, the positive or negative electrolyte may include a cation selected from the group consisting of alkali metal ions, alkaline earth metal ions and zinc group metal ions, which are dissociated from the supporting electrolyte.

Hereinafter, the present invention will be described in further detail with reference to examples and comparative examples.

EXAMPLES

Vanadium redox flow batteries were constructed using the cation exchange membrane NAFION 115 and the positive and negative electrolytes prepared in the following manner.

Example 1

50 ml of a positive electrolyte was prepared by adding 2.59 M of sulfuric acid to an aqueous solution of 1.48 M of vanadyl sulfate ($VOSO_4$) so as to have a sulfate ion concentration of 4.07 M.

50 ml of a negative electrolyte was prepared by adding 3.24 M of sulfuric acid to an aqueous solution of 1.48 M of vanadyl sulfate ($VOSO_4$) so as to have a sulfate ion concentration of 4.72 M.

Example 2

A vanadium redox flow battery was constructed in the same manner as described in Example 1, except that the positive and negative electrolytes in the battery system were modified in the following manner.

50 ml of a positive electrolyte was prepared by adding 2.92 M of sulfuric acid to an aqueous solution of 1.48 M of vanadyl sulfate ($VOSO_4$) so as to have a sulfate ion concentration of 4.4 M.

50 ml of a negative electrolyte was prepared by adding 3.12 M of sulfuric acid to an aqueous solution of 1.48 M of vanadyl sulfate ($VOSO_4$) so as to have a sulfate ion concentration of 4.6 M.

Example 3

A vanadium redox flow battery was constructed in the same manner as described in Example 1, except that the positive and negative electrolytes in the battery system were modified in the following manner.

50 ml of a positive electrolyte was prepared by adding 2.82 M of sulfuric acid to an aqueous solution of 1.48 M of vanadyl sulfate ($VOSO_4$) so as to have a sulfate ion concentration of 4.3 M.

50 ml of a negative electrolyte was prepared by adding 3.12 M of sulfuric acid and 0.1 M of hydrochloric acid to an aqueous solution of 1.48 M of vanadyl sulfate ($VOSO_4$) so as to have a total anion concentration of 4.7 M (4.6 M sulfate ion+0.1 M hydrochloride ion).

Example 4

A vanadium redox flow battery was constructed in the same manner as described in Example 2, except that 0.1 M of phosphoric acid in place of 0.1 M of hydrochloric acid was added to the negative electrolyte in the battery.

Example 5

A vanadium redox flow battery was constructed in the same manner as described in Example 1, except that the positive and negative electrolytes in the battery system were modified in the following manner.

50 ml of a positive electrolyte was prepared by adding 1.97 M of sulfuric acid to an aqueous solution of 1.48 M of vanadyl sulfate ($VOSO_4$) so as to have a sulfate ion concentration of 3.45 M.

50 ml of a negative electrolyte was prepared by adding 3.49 M of sulfuric acid and 0.2 M of hydrochloric acid to an aqueous solution of 1.48 M of vanadyl sulfate ($VOSO_4$) so as to have a total anion concentration of 5.17 M (4.97 M sulfate ion+0.2 M hydrochloride ion).

Example 6

A vanadium redox flow battery was constructed in the same manner as described in Example 1, except that the positive and negative electrolytes in the battery system were modified in the following manner.

50 ml of a positive electrolyte was prepared by adding 1.48 M of sulfuric acid to an aqueous solution of 1.48 M of vanadyl sulfate ($VOSO_4$) so as to have a sulfate ion concentration of 2.96 M.

50 ml of a negative electrolyte was prepared by adding 3.49 M of sulfuric acid and 0.2 M of hydrochloric acid to an aqueous solution of 1.48 M of vanadyl sulfate ($VOSO_4$) so as to have a total anion concentration of 5.17 M (4.97 M sulfate ion+0.2 M hydrochloride ion).

Comparative Example

A battery system was constructed in the same manner as described in Example 1, except that an electrolyte prepared by adding 3.02 M of sulfuric acid to an aqueous solution of 1.48 M of vanadyl sulfate ($VOSO_4$) so as to have a sulfate ion concentration of 4.5 M was used as 50 ml of a positive electrolyte and 50 ml of a negative electrolyte.

Evaluation

A charge/discharge test for each of the redox flow battery systems manufactured in Examples 1 to 6 and the Comparative Example was performed by driving the battery systems, and the change in volume of the positive electrolyte after 100 cycles relative to the initial volume of the positive electrolyte was measured.

The results of the measurement are shown in Table 1 below.

TABLE 1

| | $n_1$ | $n_2$ | $n_3$ | Change (%) in volume of positive electrolyte after 100 cycles relative to initial volume of positive electrolyte |
|---|---|---|---|---|
| Example 1 | 1.159 | 3.189 | 2.75 | 1 to 2 |
| Example 2 | 1.045 | 3.108 | 2.972 | 3 to 6 |
| Example 3 | 1.093 | 3.175 | 2.905 | 2 to 3 |
| Example 4 | 1.093 | 3.175 | 2.905 | 2 to 4 |
| Example 5 | 1.499 | 3.493 | 2.331 | −2 to −1 |
| Example 6 | 1.750 | 3.50 | 2.00 | −6 to −4 |
| Comparative Example 1 | 1 | 3.040 | 3.040 | 8 to 10 |

As can be seen from the test results in Table 1 above, when the total anion concentration of the negative electrolyte in the redox flow battery was higher than the total anion concentration of the positive electrolyte as disclosed in the present invention, the transfer of water during the long-term charge/discharge cycling was controlled so that the difference in volume between the positive electrolyte and the negative electrolyte could be minimized.

Accordingly, the redox flow battery according to the present invention has excellent stability, because the difference in volume between the positive electrolyte and the negative electrolyte is minimized even when the battery is repeatedly charged and discharged. In addition, the redox flow battery according to the present invention has excellent durability, because an essential free space in the positive electrolyte and negative electrolyte tanks of the redox flow battery can be reduced, and the change in internal pressure of the electrolyte storage tanks by a change in the volume of the electrolytes also decreases.

Although the preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A redox flow battery which is charged and discharged by supplying a positive electrolyte and a negative electrolyte to a battery cell,
   wherein the battery cell includes a cation exchange membrane, and the positive electrolyte and the negative electrolyte include an active material containing vanadium ions, and
   wherein while charging and discharging the redox flow battery, a difference in volume between the positive electrolyte and the negative electrolyte is maintained at 10% or less, and
   a total anion concentration of the negative electrolyte is higher than a total anion concentration of the positive electrolyte.

2. The redox flow battery of claim 1, wherein anions in each of the positive electrolyte and the negative electrolyte includes: anion (A) dissociated from the active material; and anion (B) dissociated from a supporting electrolyte, in which the anion (A) and the anion (B) are the same or different.

3. The redox flow battery of claim 2, wherein the amount of the active material in the positive electrolyte is the same as the amount of the active material in the negative electrolyte, and the amount of the supporting electrolyte in the negative electrolyte is larger than the amount of the supporting electrolyte in the positive electrolyte.

4. The redox flow battery of claim 1, wherein the concentration of the vanadium ions in the positive electrolyte is the same as the concentration of the vanadium ions in the negative electrolyte.

5. The redox flow battery of claim 1, wherein a ratio of a total anion concentration ($C_1$) of the negative electrolyte to a total anion concentration ($C_2$) of the positive electrolyte satisfies the following condition 1:

$$1 < C_1/C_2 \leq 2. \qquad \text{Condition 1}$$

6. The redox flow battery of claim 1, wherein a ratio of a total anion concentration ($C_1$) of the negative electrolyte to a vanadium ion concentration ($C_3$) of the negative electrolyte satisfies the following condition 2:

$$2 \leq C_1/C_3 \leq 3.5. \qquad \text{Condition 2}$$

7. The redox flow battery of claim 1, wherein a ratio of a total anion concentration ($C_2$) of the positive electrolyte to a vanadium ion concentration ($C_4$) of the positive electrolyte satisfies the following condition 3:

$$2 \leq C_2/C_4 \leq 3.5. \qquad \text{Condition 3}$$

8. The redox flow battery of claim 1, wherein the positive electrolyte or the negative electrolyte further includes a cation selected from the group consisting of alkali metal ions, alkaline earth metal ions and zinc group metal ions.

* * * * *